T. L. WEBSTER.
Car Starter and Brake.

No. 167,370.                                    Patented Aug. 31, 1875.

Witnesses:
Ewell A Sick,
Henry R. Elliott.

Inventor:
Theodore L. Webster
by attys Pollok & Bailey

UNITED STATES PATENT OFFICE.

THEODORE L. WEBSTER, OF BROOKLYN, NEW YORK.

IMPROVEMENT IN CAR STARTERS AND BRAKES.

Specification forming part of Letters Patent No. 167,370, dated August 31, 1875; application filed July 8, 1875.

*To all whom it may concern:*

Be it known that I, THEODORE L. WEBSTER, of Brooklyn, Kings county, New York, have invented certain new and useful Improvements in Brakes and Starters for Street-Cars, of which the following is a specification:

The apparatus I have devised may be used at will and interchangeably to brake or to stop or check the car. For this purpose I make use of a lever which operates the brakes and carries a pawl, which, when the lever is depressed, will engage a ratchet-wheel on the axle. The moment the lever rises to remove pressure from the brakes the pawl moves with the lever, and causes a partial rotation of the ratchet-wheel that it engages. The movement of the ratchet-wheel causes a corresponding movement of rotation of the car-axle and the wheels fixed thereon, which has the effect of starting, or tending to start, the car. The lever aforesaid, when depressed, also operates the brakes to press on the wheels; and, therefore, so long as the lever is in this position, the car will be braked. A stop mechanism is provided which, when occasion demands, may be used to retain the lever in its depressed position as long a time as desired.

My invention can best be explained and understood by reference to the accompanying drawing, in which—

Figure 1:
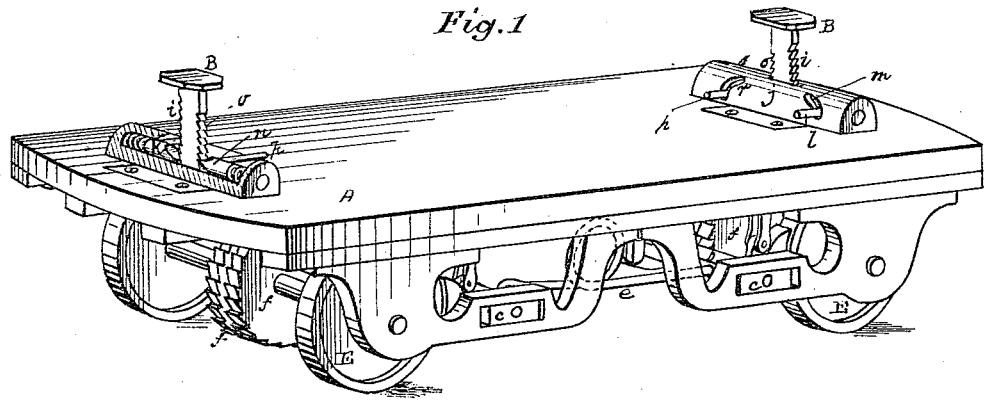
Figure 2:
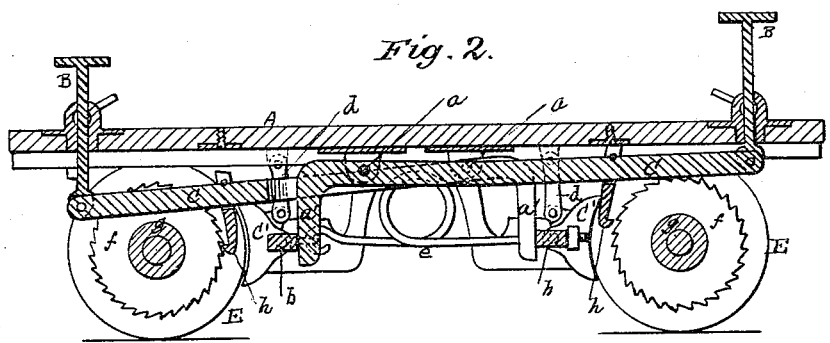
Figure 3:
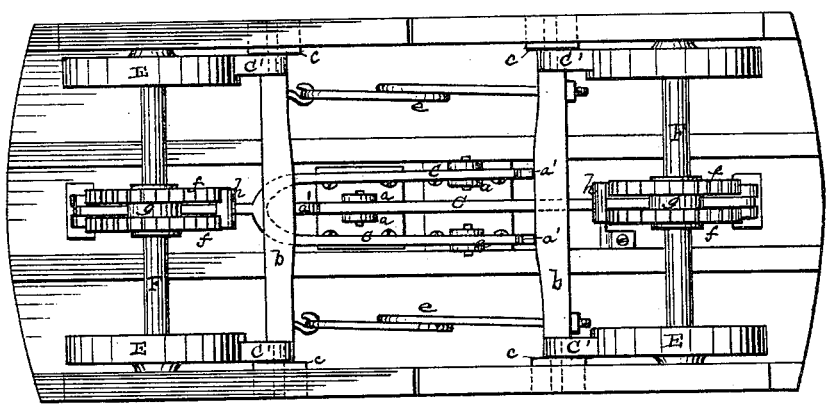

Figure 1 is a perspective view of so much of a car as is needed to illustrate my invention. Fig. 2 is a longitudinal vertical central section of the same. Fig. 3 is a plan of the under side of the car.

A is the platform of the car. One or two sets of the braking and starting apparatus may be employed, according to circumstances. In the present instance the car is one adapted to be driven with either end in front. I therefore employ two sets of apparatus. Each set is a counterpart of the other, so that a description of one will answer for both. A foot-piece or hand-piece at each end of the car may be provided to enable the driver to operate the lever D, hereinbefore mentioned. In this instance a foot-piece, B, is used. The stem of each foot-piece passes down through the platform A, and at its lower end is jointed to the outer end of the longer arm of a lever, $c$, whose pivot is at $a$, and whose shorter arm terminates in a downwardly-bent piece, $a'$, which bears against the cross-bar $b$ that connects the brakes $C'$, intended for each set of truck-wheels E. Each cross-bar $b$ is provided with end slides $c$, that take their bearings in the housings or frame of the truck. The brakes $C'$ are mounted on the cross-bar, so as to be capable of rocking thereon, and each brake-piece $C'$ is likewise connected with the under side of the platform by a link, $d$, jointed to the brake at one end and to the platform at the other, as seen in Fig. 2. When either lever C is depressed by means of its foot-piece B, its end $a'$ will push against the cross-bar $b$, which will cause the brakes to bear against their wheels. A spring may be employed to retract the brakes when pressure is removed from the foot-piece. In this instance the two cross-bars of the two sets are connected by springs $e$, which answer for both sets of brakes. The wheels E are fixed on their axles F, and centrally on each axle is also fixed a ratchet-wheel, preferably made, as seen, of two ratchet-disks, $f$, set some distance apart on a hub, $g$; the lever D enters, and can play up and down in the space between the two disks. On each lever D, in proper relation to its ratchet-wheel, is hung a pawl, $h$, which, when the lever is depressed, rides over the teeth of the ratchet. When, however, the lever rises, the pawl engages the ratchet, and by its upward movement causes a partial rotation of the axle on which the ratchet-wheel is fixed. The force of this upward movement will depend upon the power of the springs $e$; or the movement, in case a hand-piece be employed in lieu of a foot-piece, may be effected or hastened by the hand of the driver. Thus the same lever D serves at one time to operate the brakes, and at another time the starting mechanism. In order to maintain the foot-piece depressed, I form on one of its longer edges a series of upwardly-inclined teeth, $i$, and in a box, $j$, fixed to the car, and adjoining this toothed edge, I provide a sliding dog or bolt, $k$, beveled on its upper face, and pressed forward by a spring to engage the teeth $i$. This arrangement of parts permits the bar to be depressed as far as desired, but when so depressed it will be prevented from rising, owing to the shape of the bolt and the direction of inclination of the teeth. This bolt may be retracted, whenever desired, by means of a handle or projecting stud, $l$, attached to it, which works in an inclined slot, $m$, in the box. When the handle is thrown up to the upper end of the slot the bolt is in operative position. When the handle is depressed to the lower end of the slot the bolt is retracted, so as to be removed from contact with the teeth $i$. On the opposite side of each foot-piece is another stop mechanism resembling the one just described, excepting that the bevel of the bolt $n$ and the inclination of the teeth $o$ is in the opposite direction, this arrangement being for the purpose of preventing any one from putting the brake on at one end, or interfering with it in any way when the opposite end of the car is in use. The bolt $n$ is provided with a handle or stud, $p$, which works in an inclined slot, $r$, and operates in the same way as does the like handle on the bolt $k$.

Having described my invention, what I claim, and desire to secure by Letters Patent, is—

1. The pivoted vibratory lever, operated by hand or foot piece, as described, in combination with the brakes, the starting ratchet-wheel, and the pawl, substantially as shown and set forth.

2. In combination with the lever for operating the braking and starting mechanism, the vertically-movable foot-piece and the spring-locking mechanism, arranged substantially as described, to allow the depression, but prevent the rising of said foot-piece, whenever desired, substantially as set forth.

3. In combination with the foot-piece, the two spring-locking mechanisms, the one to prevent the rise and the other to prevent the depression of the foot-piece, constructed and arranged substantially as described, so that either or both may at will be thrown into or out of engagement with the foot-piece.

4. The brakes proper, mounted on the journals of, and moving with a cross-bar, provided with end slides, which take their bearing and move in the truck, housing, or frame, substantially as shown and set forth.

In testimony whereof I have hereunto signed my name this 30th day of June, A. D. 1875.

THEODORE L. WEBSTER.

Witnesses:
  JOEL EASTMAN,
  JOEL E. MORRILL.